(12) United States Patent
St. Onge et al.

(10) Patent No.: US 7,000,643 B2
(45) Date of Patent: Feb. 21, 2006

(54) BLADDER SYSTEM FOR CONDUIT EXPANSION

(75) Inventors: Bryan St. Onge, Hastings (CA); Henri St. Onge, Hastings (CA)

(73) Assignee: Underground Solutions Technologies Group, Inc., Sarver, PA (US)

( * ) Notice: Subject to any disclaimer, the term of this patent is extended or adjusted under 35 U.S.C. 154(b) by 0 days.

(21) Appl. No.: 10/865,739

(22) Filed: Jun. 10, 2004

(65) Prior Publication Data

US 2005/0016607 A1    Jan. 27, 2005

Related U.S. Application Data

(60) Provisional application No. 60/478,483, filed on Jun. 13, 2003.

(51) Int. Cl.
*F16L 55/16* (2006.01)

(52) U.S. Cl. .............................. 138/98; 138/97; 138/93; 138/104; 156/287; 156/94; 264/269

(58) Field of Classification Search ................. 138/98, 138/97, 93, 104; 156/287, 291, 296, 94; 264/269, 36, 36.1
See application file for complete search history.

(56) References Cited

U.S. PATENT DOCUMENTS

| | | | |
|---|---|---|---|
| 4,067,349 A * | 1/1978 | Austin et al. .................. 38/97 |
| 4,361,451 A | 11/1982 | Renaud ........................ 156/64 |
| 4,646,787 A * | 3/1987 | Rush et al. .................... 138/98 |
| 4,671,840 A | 6/1987 | Renaud ........................ 156/287 |
| 5,346,658 A | 9/1994 | Gargiulo ...................... 264/40.3 |
| 5,368,809 A | 11/1994 | Steketee, Jr. .............. 264/36.17 |
| 5,397,513 A | 3/1995 | Steketee, Jr. ................. 264/516 |
| 5,487,411 A | 1/1996 | Goncalves .................... 138/98 |
| 5,490,964 A | 2/1996 | Kamiyama et al. ....... 264/36.17 |
| 5,503,190 A | 4/1996 | Kamiyama et al. ........... 138/98 |
| 5,706,861 A | 1/1998 | Wood et al. ................... 138/98 |
| 5,794,662 A | 8/1998 | St. Onge et al. .............. 138/97 |
| 5,855,729 A | 1/1999 | Kiest, Jr. et al. ........... 156/423 |
| 5,927,341 A | 7/1999 | Taylor .......................... 138/98 |
| 6,050,300 A * | 4/2000 | Schwert et al. ............... 138/98 |
| 6,093,363 A | 7/2000 | Polivka ....................... 264/516 |
| 6,676,398 B1 * | 8/2001 | Lange .......................... 138/98 |
| 6,539,979 B1 | 4/2003 | Driver .......................... 138/98 |
| 2003/0015247 A1 | 1/2003 | Driver et al. .................. 138/98 |

* cited by examiner

*Primary Examiner*—Patrick Brinson
(74) *Attorney, Agent, or Firm*—The Webb Law Firm; Nathan J. Prepelka

(57) ABSTRACT

Disclosed is a bladder system for use in conjunction with a conduit expansion process and system. In addition, the bladder system is in operative communication with an injection material handling system. The bladder system includes a bladder element with injection hardware positioned on one end and distal end hardware positioned on the other end. The injection hardware and the distal end hardware are integrally attached to the bladder element, and the bladder element is capable of expanding and contracting inside the liner conduit.

18 Claims, 1 Drawing Sheet

BLADDER SYSTEM FOR CONDUIT EXPANSION

CROSS REFERENCE TO RELATED APPLICATIONS

This application takes priority from U.S. Provisional Patent Application No. 60/478,483, filed Jun. 13, 2003, which is incorporated herein by reference in its entirety.

BACKGROUND OF THE INVENTION

1. Field of the Invention

The present invention relates generally to systems for repairing conduit, such as utilizing a conduit expansion process and, in particular, to a bladder system with accompanying hardware for expanding a liner conduit within a host conduit in such a conduit expansion process.

2. Description of Related Art

Conduit systems are used extensively throughout the world in order to transfer or convey material, such as water and other fluids, from location to location for distribution throughout the system. For example, extensive conduit systems are used to distribute water to both residences and businesses for use and further processes. Typically, such conduit or piping systems are located underground, as aboveground piping would be both unsightly and intrusive.

Typical water conduit systems transport material through pipe, e.g., cast iron, ductile iron, reinforced concrete, cement-asbestos, etc., buried underground with the branches extending in various directions in order to reach the end user. Normally, after many years of use, or for some other reason, the present piping fails and begins to leak, thereby reducing line pressure and unnecessarily allowing water to leak into the area surrounding the piping. Such leaks not only affect the system, but increase the processing costs of the supplier, which, in turn, increases the end user costs. Therefore, these leaks must be quickly repaired and preventative measures taken to ensure that further leakage is prevented.

Due to the underground positioning of the conduit system, repairing a leaking pipe is particularly labor intensive and time consuming. Trenches must be dug along the pipeline to locate the leak and effectively repair it prior to putting the pipe back in service. Various lining systems have been developed according to the prior art in an attempt to seal a leaking pipe or a pipe that has fallen into disrepair, whether to repair a present crack or to preventatively ensure against future cracks or breaks. In addition, the use of a much smaller diameter pipe within the larger diameter cracked or broken pipe has been used. However, this merely replaces the problem of a cracked outer pipe with a cracked or otherwise leaking inner pipe. Still further, using such a pipe-in-pipe system drastically reduces the flow through the conduit system and evidences unwanted and varying pressure parameters.

To that end, a pipe liner and method of installation have been developed, as disclosed in U.S. Pat. No. 5,794,662 to St. Onge et al., specifically directed to pressurized pipeline applications. The St. Onge patent is directed to a method of relining sewer lines, water lines or gas lines, and uses a segmented liner of reduced size relative to the pipe being relined. However, as opposed to merely leaving the small diameter liner conduit within the large diameter outer conduit, the method of the St. Onge patent uses heat and/or pressure to mold the reduced size pipe to the shape of the pipe being relined. In particular, the inner or liner conduit is a thermoplastic pipe, typically a polyvinyl chloride (PVC) pipe that, when exposed to heat or pressure, expands and molds against the inside of an existing conduit to effect the relining of it. This process allows for both the lining of the entire length of pipe or only a portion of it that is damaged, which is typically referred to as "spot repair."

According to the St. Onge patent, once the length of the liner conduit is inserted into the existing or host conduit, the liner conduit is plugged at either end and exposed to steam under pressure to heat the liner conduit along its length and apply pressure, which urges it to expand and contact the interior walls of the surrounding host conduit. Once the liner conduit has fully expanded to conform to the interior surface of the existing conduit, it is cooled and the plugs are removed. The resulting expanded liner conduit conforms to the walls of the host conduit, thereby preventing any further leakage. Also, the method of the St. Onge patent requires only pits to be dug at either end of the section to be repaired.

While the St. Onge patent represents an advance in the art of relining and repairing underground conduit systems, there is room in the art for additional improvements and advancements. Various systems and processes have been developed for repairing damaged conduit. For example, see U.S. Pat. No.: 5,855,729 to Kiest, Jr. et al; U.S. Pat. No. 5,487,411 to Goncalves; U.S. Pat. No. 5,346,658 to Gargiulo; U.S. Pat. No. 6,093,363 to Polivka; U.S. Pat. No. 5,397,513 to Steketee, Jr.; U.S. Pat. No. 5,346,658 to Gargiulo; U.S. Pat. No. 5,706,861 to Wood et al.; U.S. Pat. No. 5,368,809 to Steketee, Jr.; U.S. Pat. No. 4,671,840 to Renaud; U.S. Pat. No. 5,927,341 to Taylor; U.S. Pat. No. 5,503,190 and U.S. Pat. No. 5,490,964 to Kamiyama et al.; U.S. Pat. No. 4,361,451 to Renaud; and U.S. Pat. No. 6,539,979 to Driver; and Publication No. 2003/0015247 to Driver et al. However, such systems and processes have several drawbacks based upon their advanced structural and mechanical setup, as well as the complex methods of installation and operation. In order to expand the liner conduit within the host conduit, mechanical systems and fittings are required at both ends of the liner conduit, as inserted in the host conduit. In addition, this hardware must be attached directly to both the liner conduit and the host conduit, which requires further and more labor-intensive interaction between the installers and the buried conduit system. Therefore, when using hardware that must be attached directly to the liner conduit and/or the host conduit, a significantly larger trench is required, such that at least one person can be positioned immediately adjacent the ends of the liner conduit and/or the host conduit for making the appropriate connections and engaging the fittings of the hardware of the system.

SUMMARY OF THE INVENTION

It is, therefore, an object of the present invention to provide a bladder system for conduit expansion that overcomes the deficiencies of the prior art. It is another object of the present invention to provide a bladder system for conduit expansion that includes integrated hardware and other fittings, such that a single structure is required for use in connection with the conduit expansion system. It is yet another object of the present invention to provide a method of expanding a liner conduit within a host conduit in a conduit expansion process.

The present invention is directed to a bladder system for use in connection with a conduit expansion process, where a liner conduit is positioned within a host conduit, and preferably where the liner conduit is expanded within the host conduit and pressed against an inside wall of the host conduit. The bladder system includes a bladder element with a first end, a second end and an internal area therein. The bladder system further includes appropriate injection hardware positioned at the first end of a bladder element and distal end hardware positioned at the second end of the bladder element. The injection hardware is integrally attached to the first end of the bladder element, and the distal end hardware is integrally attached to the second end of the bladder element.

In one preferred and non-limiting embodiment, the bladder system includes an injection material handling system that works in conjunction with the bladder system for injecting a material, such as steam, air, fluid or the like, into the bladder element, thereby expanding the bladder element against an inside wall of the liner conduit, which, in turn, expands the liner conduit against the inside wall of the host conduit. In another preferred and non-limiting embodiment, the bladder system includes a control mechanism in communication with the injection hardware, the distal end hardware, the bladder element and/or the injection material handling system. This control mechanism communicates with and controls the various components and sub-components of the bladder system.

The present invention is also directed to a method of expanding a liner conduit within a host conduit. The method includes the steps of: at least partially inserting the bladder element within the liner conduit; injecting a material through the injection hardware into the internal area of the bladder element; heating, by convection, the liner conduit via the injected material; and expanding the bladder element, and thereby expanding the liner conduit within the host conduit. Thereafter, the liner conduit is cooled by injecting a cooling material into the bladder element, such that the liner conduit is cooled in place.

The present invention, both as to its construction and its method of operation, together with the additional objects and advantages thereof, will best be understood from the following description of exemplary embodiments when read in connection with the accompanying drawings.

DESCRIPTION OF THE PREFERRED EMBODIMENTS

Figure 1:
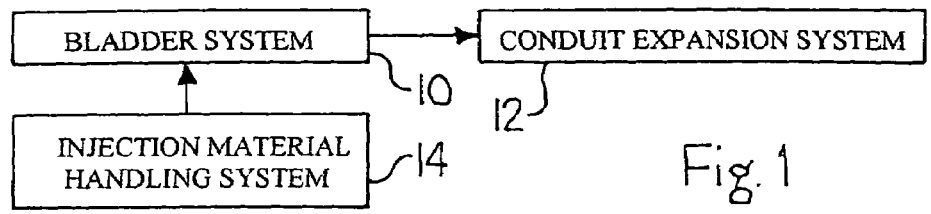
FIG. 1 is a schematic view of a bladder system for conduit expansion according to the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
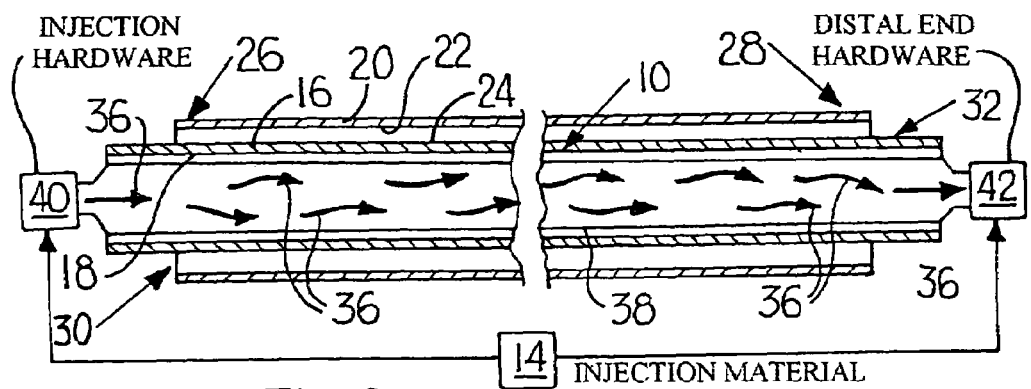
FIG. 2 is a schematic and partial sectional view of a preferred embodiment of a bladder system for conduit expansion according to the present invention.
Figure 3:
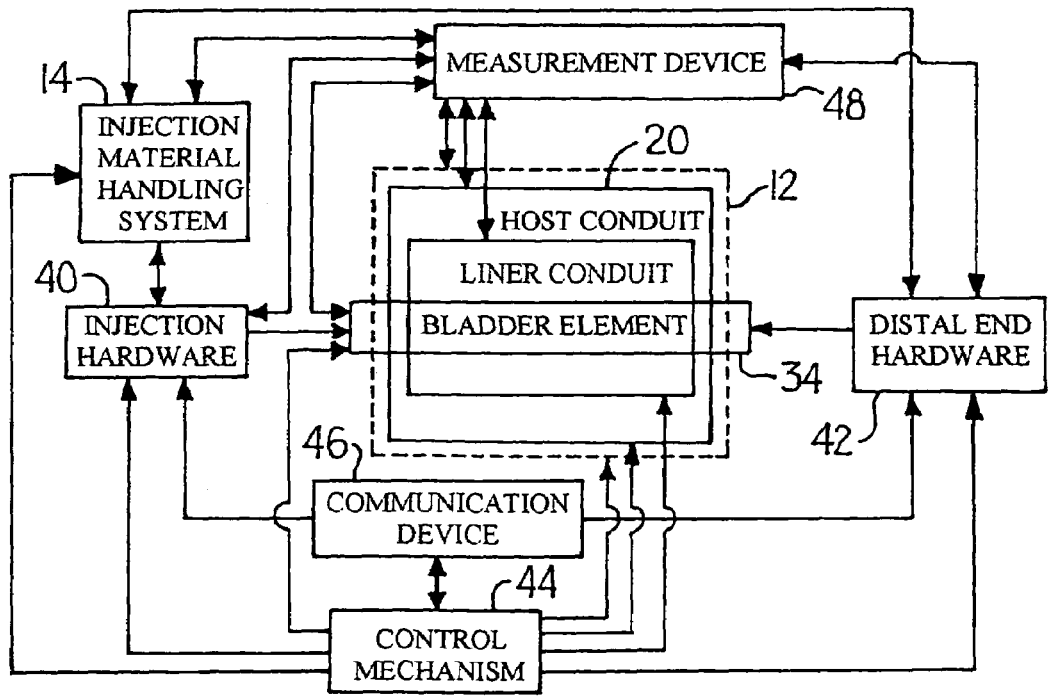
FIG. 3 is a schematic view of a further preferred embodiment of a bladder system for conduit expansion according to the present invention.

The present invention is a bladder system 10 for use in connection with a conduit expansion process and is illustrated in various embodiments in FIGS. 1–3. Specifically, with reference to FIG. 1, the bladder system 10 is typically used in connection with a conduit expansion system 12, and is also in an operative relationship or in fluid communication with an injection material handling system 14. As seen in FIG. 2, the conduit expansion process or system 12 includes a liner conduit 16 having an inner wall 18 positioned within a host conduit 20 having an inner wall 22. In a preferred embodiment, the liner conduit 16 is manufactured from a thermoplastic material, such as polyvinyl chloride. However, it is envisioned that any material having the appropriate expansion characteristics can be used. The bladder system 10 works equally effectively with any expandable liner conduit 16. In operation of the conduit expansion system 12, the liner conduit 16, and specifically the liner conduit inner wall 18, is subject to heat and pressure, which expands the thermoplastic material, such that a liner conduit outer wall 24 moves into contact with the host conduit inner wall 22.

After a particular portion of the host conduit 20 is identified for repair or relining, access is gained, typically by digging a pit to a host conduit first end 26 and a host conduit second end 28. Using known bend characteristics and measurements, the liner conduit 16 is fed through the host conduit first end 26 until a liner conduit first end 30 is located adjacent the host conduit first end 26 and a liner conduit second end 32 is located adjacent the host conduit second end 28. In this manner, the liner conduit 16 is positioned within the host conduit 20 and ready for the expansion process.

As seen in FIG. 2, the bladder system 10 includes a bladder element 34, which is manufactured from a flexible, expandable material, such as rubber, a synthetic polymer or other similar material having the appropriate flexibility and memory characteristics. The bladder element 34 is positioned within the liner conduit 16. In order to expand the bladder element 34, injection material 36 is injected into the bladder element 34, causing the bladder element 34 to expand, with a bladder element outer wall 38 contacting the liner conduit inner wall 18, thereby expanding the liner conduit 16 within the host conduit 20. After the expansion process is complete, the remaining injection material 36 is removed from the bladder element 34, which causes the bladder element 34 to collapse and further allows for easy removal of the bladder element 34 from the liner conduit 16.

In order to assist in expanding the bladder element 34 in a controlled manner, injection hardware 40 is in operative and fluid communication with the bladder element 34 at the host conduit first end 26 and the liner conduit first end 30. Similarly, distal end hardware 42 is in operative and fluid communication with the bladder element 34, as positioned near the host conduit second end 28 and the liner conduit second end 32. Both the injection hardware 40 and the distal end hardware 42 allow for the controlled injection of injection material 36, such as steam, air, fluid, water or the like. In addition, both the injection hardware 40 and the distal end hardware 42 are manufactured with or integral with the bladder element 34, such that the resulting bladder system 10 is a complete and integral structure that can be easily inserted within and removed from the liner conduit 16 as a contiguous unit.

In the preferred and non-limiting embodiment of FIG. 2, the injection material 36 is steam and pressurized air. Specifically, the injection material handling system 14 injects steam and/or air into the bladder element 34 via the injection hardware 40. The injection material 36 moves along and expands the bladder element 34, such that the bladder element outer wall 38 contacts the liner conduit inner wall 18, effecting the expansion process as discussed above. Once the appropriate pressures, temperatures and expansion occur, the steam and/or air is exhausted through the distal end hardware 42 and back into the injection material handling system 14. Since the bladder element 34 is a flexible and controllable part of the bladder system 10, the flow of injection material 36 into the bladder element 34 allows for uniform expansion of the liner conduit 16 within the host conduit 20. The expanded bladder element 34 will be held in place at the appropriate operating parameters until the liner conduit 16 attains the required expansion, where the liner conduit outer wall 24 contacts the host conduit inner wall 22, at which point the bladder system 10, working in conjunction with the conduit expansion system 12, allows for the cooling of the liner conduit 16 within the host conduit 20.

Another preferred and non-limiting embodiment is illustrated in FIG. 3. In this embodiment, the injection material 36 is a fluid material, such as hot water. Therefore, the injection material handling system 14 injects the water or fluid into the bladder element 34 via the injection hardware 40. As with the steam and/or air being used as injection material 36, as discussed above, the fluid or water likewise expands the bladder element 34 against the liner conduit inner wall 18. However, in this embodiment, the distal end hardware 42 is not used as an exhaust or outlet for the injection material 36 after usage. Instead, the distal end hardware 42 includes the appropriate attachments, connections and fittings, where the distal end hardware 42 acts as a cap, forcing the injection material 36 back along and within the bladder element 34 toward the injection hardware 40. After the injection material 36 moves or flows back and into the injection hardware 40, the fluid is recycled back to the injection material handling system 14, in this case a fluid system. Again, the use of this expandable bladder element 34 in connection with a fluid injection material 36 provides a more uniform distribution of heat and pressure throughout the bladder element 34.

Also, as seen in FIG. 3, this preferred and non-limiting embodiment includes a control mechanism 44, which acts to communicate with, monitor and/or control any one of the components and sub-components of the injection hardware 40, the distal end hardware 42, the bladder element 34, and/or the injection material handling system 14. Further, it is envisioned that the control mechanism 44 can monitor and/or control any one or more of the components and subcomponents of the conduit expansion system 12. Therefore, this control mechanism 44 can act as an integrated control unit for use in monitoring the physical parameters of the bladder system 10, the conduit expansion system 12 and/or the injection material handling system 14 for use in process monitoring and making process improvements. For example, the control mechanism 44 may be configured to: (i) monitor at least one physical characteristic of at least one of a material 36 injected into the bladder element 34 and the material 36 removed from the bladder element 34; (ii) control at least one physical characteristic of at least one of the injected material 36 and removed material 36; (iii) monitor at least one physical characteristic of the conduit expansion process 12; (iv) control at least one physical characteristic of the conduit expansion process 12; (v) monitor at least one physical characteristic of the host conduit 16 and/or the liner conduit 20; and (vi) control at least one physical characteristic of the host conduit 16 and/or the liner conduit 20.

The control mechanism 44 may be a computing device, such as a portable computer, laptop, a PDA, a palmtop, a computer, a personal computer, an embedded microprocessor, a networked computer and a server. In addition, this control mechanism 44 is loaded with control software that enables the control mechanism 44 to: (i) receive and process signals transmitted from the injection hardware 40 and/or the distal end hardware 42; (ii) transmit signals to the injection hardware 40 and/or the distal end hardware 42; (iii) monitor at least one physical characteristic of the conduit expansion process 12, the injection hardware 40, the distal end hardware 42, the bladder element 34, the injection material handling system 14, a material 36 in contact with the injection hardware 40 and/or a material in contact with the distal end hardware 42; (iv) track at least one physical characteristic of the conduit expansion process 12, the injection hardware 40, the distal end hardware 42, the bladder element 34, the injection material handling system 14, a material 36 in contact with the injection hardware 40 and/or a material 36 in contact with the distal end hardware 42; (v) control at least one physical characteristic of at least one of the conduit expansion process 12, the injection hardware 40, the distal end hardware 42, the bladder element 34, the injection material handling system 14, a material 36 in contact with the injection hardware 40 and/or a material 36 in contact with the distal end hardware 42; (vi) control operation of at least one component of the injection hardware 40, the distal end hardware 42 and/or the injection material handling system 14; (vii) store data directed to at least one physical characteristic of the conduit expansion process 12, the injection hardware 40, the distal end hardware 42, the bladder element 34, the injection material handling system 14, a material 36 in contact with the injection hardware 40, a material 36 in contact with the distal end hardware 42, an operation parameter of the injection hardware 40 and an operation parameter of the distal end hardware 42.

The bladder system 10 may also includes a communication device 46. In a preferred and non-limiting embodiment, the communication device 46 is positioned on or in operative communication with injection hardware 40 and/or the distal end hardware 42, and this communication device 46 is in communication with the control mechanism 44. Still further, the communication device 46 transmits, processes and receives signals with the control device 44 to effect control over the bladder system 10, and this communication may be wireless or hardwired.

The bladder system may also include one or more measurement devices 48. These measurement devices 48 may be positioned on or in operative communication with the bladder element 34, the injection hardware 40, the distal end hardware 42, the liner conduit 16 and/or the host conduit 20. Further, the measurement device 48 can measure a physical characteristic of the material 36 injected into the bladder element 34, the bladder system 10, the conduit expansion process 12, the injection hardware 40, the distal end hardware 42, the bladder element 34, the liner conduit 16 and/or the host conduit 20. For example, the measurement device 48 may measure the pressure or temperature of the injected material 36.

In this manner, the present invention provides a bladder system 10 that can be used in conjunction with the conduit expansion process and system 12, as well as the injection material handling system 14. The bladder system 10 is not limited to the use of steam and/or air, and may also use a fluid, such as water, as the injection material 36. Since the injection hardware 40 and the distal end hardware 42 are integral with the bladder element 34, the resulting bladder system is an easily positionable and transportable integral structure. The installer need only insert the bladder system 10 within the liner conduit 16, make the appropriate connections with the injection material handling system 14 and proceed with the expansion process. The installer need not be positioned within a large trench to make any difficult fittings or connections at either the host conduit first end 26 and/or the host conduit second end 28. Still further, the length of the bladder element 34 may be variable, such that the bladder system 10 is useful for both extended conduit lining as well as spot repair.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A bladder system for use in connection with a conduit expansion process, wherein a liner conduit is positioned at least partially within a host conduit, the bladder system comprising:
   a bladder element having a first end and a second end;
   injection hardware in fluid communication with the first end of the bladder element;
   distal end hardware in fluid communication with the second end of the bladder element; and
   a control mechanism in communication with the injection hardware, the distal end hardware, the bladder element, an injection material handling system, or any combination thereof and configured to: (i) communicate with and/or control the conduit expansion process, the injection hardware, the distal end hardware, the bladder element, the injection material handling system, or any combination thereof; (ii) monitor at least one physical characteristic of at least one of the host conduit and the liner conduit; (iii) track at least one physical characteristic of the conduit expansion process, the injection hardware, the distal end hardware, the bladder element, the injection material handling system, a material in contact with the injection hardware, a material in contact with the distal end hardware, or any combination thereof; and (iv) store data directed at least one physical characteristic of the conduit expansion process, the injection hardware, the distal end hardware, the bladder element, the injection material handling system, the material in contact with the injection hardware, the material in contact with the distal end hardware, an operation parameter of the injection hardware, an operation parameter of the distal end hardware, or any combination thereof;
   wherein at least one of the injection hardware and the distal end hardware include a communication device in wireless communication with the control mechanism and configured to at least one of transmit, process and receive signals;
   wherein the injection hardware and the distal end hardware are integrally attached to the first end of the bladder element and the second end of the bladder element respectively.

2. The bladder system of claim 1, wherein the bladder element is formed from a flexible, expandable material.

3. The bladder system of claim 1, wherein the bladder element is formed from at least one of rubber, a synthetic polymer and a material having predetermined flexibility and memory characteristics.

4. The bladder system of claim 1, wherein the bladder element is configured for placement at least partially within the liner conduit and further configured to contain an injected material.

5. The bladder system of claim 4, wherein the injected material is at least one of steam, air, pressurized air, water, elevated temperature water and fluid.

6. The bladder system of claim 4, wherein the injected material is injected through the injection hardware into an internal area in the bladder element.

7. The bladder system of claim 6, wherein the injected material is removed from the internal area in the bladder element through at least one of the distal end hardware and the injection hardware.

8. The bladder system of claim 4, further comprising an injection material handling system in operative communication with at least one of the injection hardware and the distal end hardware and configured to process a material at least one of prior to, during or after injection thereof.

9. The bladder system of claim 1, wherein the control mechanism is further configured to at least one of:
   (i) monitor at least one physical characteristic of at least one of a material injected into the bladder element and a material removed from the bladder element;
   (ii) control at least one physical characteristic of at least one of the injected material and removed material;
   (iii) monitor at least one physical characteristic of the conduit expansion process;
   (iv) control at least one physical characteristic of the conduit expansion process;
   (v) control at least one physical characteristic of at least one of the host conduit and the liner conduit.

10. The bladder system of claim 1, wherein the control mechanism is a computing device.

11. The bladder system of claim 10, wherein the computing device is at least one of a portable computer, laptop, a PDA, a palmtop, a computer, a personal computer, an embedded microprocessor, a networked computer and a server.

12. The bladder system of claim 1, wherein the control mechanism is loaded with control software configured to enable the control mechanism to at least one of:
   (i) receive and process signals transmitted from at least one of the injection hardware and the distal end hardware;
   (ii) transmit signals to at least one of the injection hardware and the distal end hardware;
   (iii) monitor at least one physical characteristic of at least one of the conduit expansion process, the injection hardware, the distal end hardware, the bladder element, an injection material handling system, a material in contact with the injection hardware and a material in contact with the distal end hardware;
   (iv) control at least one physical characteristic of at least one of the conduit expansion process, the injection hardware, the distal end hardware, the bladder element, an injection material handling system, a material in contact with the injection hardware and a material in contact with the distal end hardware; and
   (v) control operation of at least one component of at least one of the injection hardware, the distal end hardware and an injection material handling system;

13. The bladder system of claim 1, wherein at least one of the injection hardware and the distal end hardware comprise at least one measurement device configured to measure at least one physical characteristic of at least one of a material injection into the bladder element, the conduit expansion process, the host conduit and the liner conduit.

14. The bladder system of claim 1, wherein a measurement device measures at least one of the pressure and the temperature of the injected material.

15. A method of expanding a liner conduit within a host conduit in an conduit expansion process, comprising the steps of:
- at least partially inserting a bladder element within the liner conduit, the bladder element including injection hardware integrally attached to a first end of the bladder element and distal end hardware integrally attached to a second end of the bladder element;
- injecting a material through the injection hardware into an inner area of the bladder element;
- heating, by convection, the liner conduit via the injected material; and
- expanding the bladder element, and thereby expanding the liner conduit within the host conduit.

16. The method of claim 15, wherein the injected material is at least one of steam, air, pressurized air, water, elevated temperature water and fluid.

17. The method of claim 15, further comprising the step of removing the injected material through at least one of the injection hardware and the distal end hardware.

18. The method of claim 15, further comprising the step of cooling the expanded liner conduit through injection of a cooling material through the injection hardware into the inner area of the bladder element.

* * * * *

UNITED STATES PATENT AND TRADEMARK OFFICE
CERTIFICATE OF CORRECTION

PATENT NO. : 7,000,643 B2
APPLICATION NO. : 10/865739
DATED : February 21, 2006
INVENTOR(S) : St. Onge et al.

It is certified that error appears in the above-identified patent and that said Letters Patent is hereby corrected as shown below:

<u>Title Page</u>, See Item (56) References Cited, U.S. PATENT DOCUMENTS, Third reference from the bottom, "6,676,398 B1" should read -- 6,276,398 B1 --

<u>Column 7,</u> Claim 1, line 44, "directed at least" should read -- directed to at least --

Signed and Sealed this

Twenty-fifth Day of July, 2006

JON W. DUDAS
*Director of the United States Patent and Trademark Office*